United States Patent [19]

Tominaga

[11] Patent Number: 5,062,951
[45] Date of Patent: Nov. 5, 1991

[54] FILTERING DEVICE FOR HOUSEHOLD AQUARIUMS

[75] Inventor: Kazutoshi Tominaga, Higashiosakashi, Japan

[73] Assignee: Kabushiki Kaisha Tominaga Jyushi Kobyosho, Osaka, Japan

[21] Appl. No.: 483,058

[22] Filed: Feb. 21, 1990

[51] Int. Cl.⁵ .............................................. A01K 63/04
[52] U.S. Cl. .................................. 210/169; 210/416.2; 119/5
[58] Field of Search ................. 210/169, 416.2; 119/4, 119/5

[56] References Cited

U.S. PATENT DOCUMENTS

| D. 184,842 | 4/1959 | Willinger | D91/2 |
|---|---|---|---|
| 2,636,473 | 4/1953 | Schwartz et al. | 119/5 |
| 2,935,199 | 5/1960 | Willinger | 210/169 |
| 3,151,069 | 9/1964 | Halpert | 119/5 |
| 3,487,935 | 1/1970 | Lovitz | 119/5 |
| 3,662,889 | 5/1972 | Takarabe | 210/169 |
| 3,738,491 | 6/1973 | Dockery | 210/169 |
| 3,795,225 | 3/1974 | Ogui | 210/169 |
| 3,924,570 | 12/1975 | Lamonica | 210/169 |
| 4,206,054 | 6/1980 | Moore et al. | 210/169 |
| 4,216,090 | 8/1980 | Dockery | 210/169 |
| 4,385,989 | 5/1983 | Margolis | 210/169 |
| 4,802,980 | 2/1989 | Gilkey et al. | 210/169 |
| 4,817,561 | 4/1989 | Byrne | 210/169 |
| 4,894,151 | 1/1990 | Woltmann | 210/169 |
| 4,897,188 | 1/1990 | Ogawa | 210/169 |
| 4,944,871 | 7/1990 | Ogawa | 210/169 |

Primary Examiner—Peter Hruskoci
Assistant Examiner—Robert James Popovics
Attorney, Agent, or Firm—Collard, Roe & Galgano

[57] ABSTRACT

A filtering device for household aquariums, the filtering device including a first chamber and a second chamber with a pump unit interposed therebetween, the second chamber having a filter medium and the first chamber being placed on the aquarium bottom. The pump unit, when driven, circulates the water in the aquarium through the second chamber, the filter medium, and the first chamber.

13 Claims, 2 Drawing Sheets

FILTERING DEVICE FOR HOUSEHOLD AQUARIUMS

BACKGROUND OF THE INVENTION

1. Field of the Invention

The present invention relates to a filtering device adapted for use in household aquariums.

2. Description of the Prior Art

U.S. Pat. No. 2,935,199 discloses a filtering device for aquariums which has a member for supporting an aquarium bed and formed with a plurality of openings of a size to prevent passage therethrough of the particles constituting the bed, the supporting member being spaced above the aquarium bottom to provide a chamber therebetween and suction producing means draw water from the chamber and circulate the same back into the aquarium above the bed.

A major disadvantage of the prior art filtering device is that all filth is not sucked from the aquarium bed or filtered through the filter medium and most of it remains unfiltered among pebbles and sand on the aquarium bed. The unfiltered filth must be frequently removed from the aquarium, and the filter medium must be replaced at regular time intervals. In addition, the pebbles and sand must be washed. To keep the water in the aquarium clean, the bother maintenance is required.

SUMMARY OF THE INVENTION

Accordingly, the present invention is directed toward a filtering device which solves the problems and drawbacks discussed above with respect to the prior art filtering device.

An object of the present invention is to provide a filtering device capable of clearing filth from the aquarium thereby to eliminate the bother to wash the aquarium bed, pebbles and sand laid on the bottom.

According to the present invention, there is provided a filtering device adapted for use in household aquariums, the device comprising:

a first casing having openings through its walls communicating with the inside of the aquarium, the fisrt casing being placed on the aquarium bottom;

a second casing having openings through its walls communicating with the inside of the aquarium, the second casing being located above the first casing;

a filter medium housed in the second casing;

a passageway for communication from the first casing to the second casing;

a pump unit located midway between the first casing and the second casing so that the water in the aquarium is circulated through the second casing, the filter medium, the passageway, and the first casing.

Thus, the water in the aquarium is circulated through the second casing, the filter medium, and the first casing, thereby enabling a filtered water to return to the aquarium. Owing to the water circulation, the filth deposits on the gravel drifts, and is absorbed into the second casing where it is caught by the filter medium.

DETAILED DESCRIPTION OF THE PREFERRED EMBODIMENT

Figure 1:
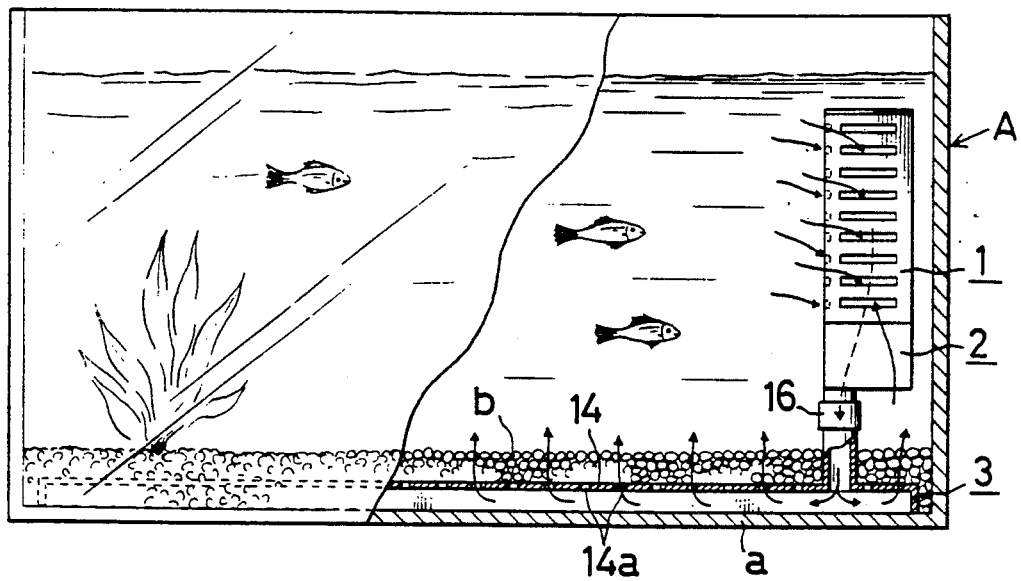
FIG. 1 is a side view showing an aquarium including a filtering device according to the present invention.
Figure 2:
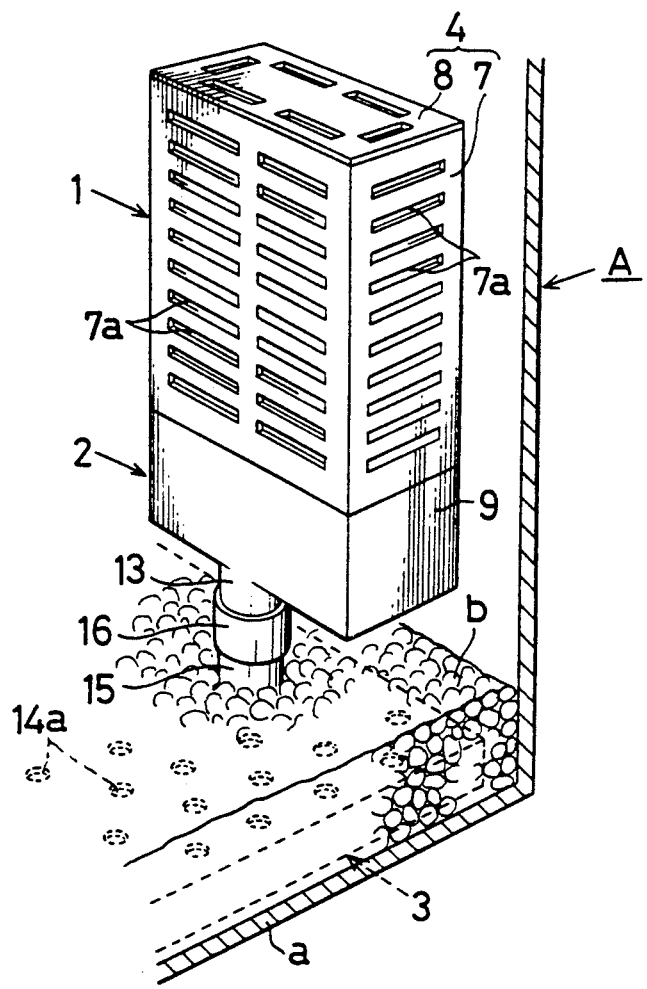
FIG. 2 is a perspective view showing the filtering device of FIG. 1.

As best shown in FIG. 1, the filtering device comprises a filter box 1, a pump 2 and a lower casing 3.

The upper casing 4 comprises a cylindrical body 7 having a larger top open end and a restricted lower open end 6, the top open end being normally covered with a lid 8. The cylindrical body 7 and the lid 8, made of nonflexible plastics, are provided with slits 7a through which a filthy water in an aquarium (A) is sucked as indicated by arrows. The upper casing 4 houses filter mediums 5; in the illustrated embodiment, a cylindrical hollow filter medium 5 is employed, wherein the inner space is aligned with the restricted open end. The filter medium 5 is replaced with new ones when they are saturated with filth.

The cylindrical body 7 is detachably connected to a pump casing 9 of nonflexible plastic. The connection therebetween is effected by enabling a ring-shaped leg 7b of the cylindrical body 7 to fit in a rim 9a of the pump casing 9. The pump casing 9 houses a pump unit 2 which comprises an impeller 11 connected to a rotor 10 driven by a magnetizing coil 12. The impeller 11 is located adjacent to the restricted open end 6 of the cylindrical body 7. The pump casing 9 includes a partition 9b enclosing the rotor 10. The magnetizing coil 12 is housed in a watertight chamber defined by the partition 9b and a wall portion 9c of the pump casing 9. The rotation of the impeller 11 provides a sucking force so as to draw the water in the upper casing 4 into the pump casing 9. The pump casing 9 includes a passageway 13 which extends downward through a bottom wall 9d of the pump casing 9 and is connected to an introductory portion 15 of the lower casing 3 by a coupling 16 so as to enable the passageway 13 to communicate with the lower casing 3 at its lower end whereas its upper portion communicates with the restricted open end 6 of the upper casing 4.

Figure 3:
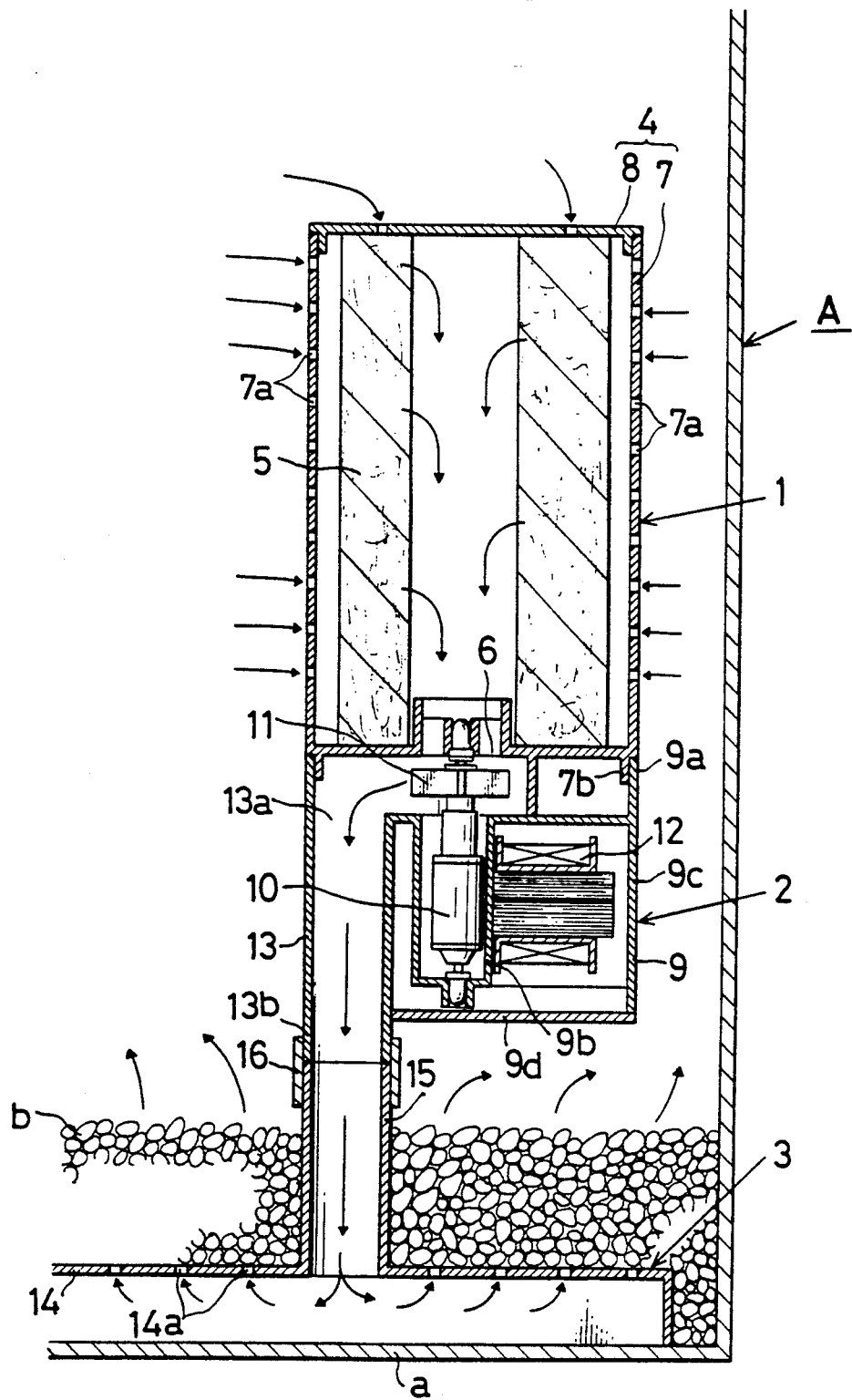
FIG. 3 is a cross-sectional side view on an enlarged scale showing the filtering device and a pump disposed in the aquarium whose greater part is omitted.

The lower casing 3 of nonflexible plastics is placed on the aquarium bottom so that its open end is closed by the aquarium bottom wall (a) as shown in FIGS. 1 and 3. The size of the lower casing 3 is such that it substantially covers the whole area of the aquarium bottom. The lower casing 3 is provided with openings 14a through which the filtered water returns into the aquarium (A).

For use, at first the lower casing 3 is buried in gravels (b) placed on the aquarium bottom wall (a), and then the upper casing 4 is connected to the lower casing 3 by connecting the passageway 13 thereof to the introductory portion 15 of the lower casing 3 by means of the coupling 16.

The magnetizing coil 12 is energized by a power source (not shown) so as to actuate the pump unit 2. The impeller 11 rotates to withdraw the filthy water in the aquarium (A) through the filter medium 5. In this way the filthy water is filtered by the filter medium 5, and returned into the aquarium (A) by way of the passageway 13 and the lower casing 3. The filtered water is forced through the gravels (b) so that the filth sticking thereto is kept away from the gravels and aquarium walls and drifts in the aquarium (A). The drifting filth is sucked into the upper casing through the openings 7a, and after being filtered through the filter medium 5, it is withdrawn into the lower casing 3 through the pump casing 9 and the passageway 13.

It should be understood that the detailed description and specific embodiment are given by way of illustration only, and various changes and modifications within the spirit and scope of the invention is of course possible. The water circulating route can be constructed differently from the embodiment described above.

What is claimed is:

1. A filtering device adapted for use in household aquariums, the device comprising:
   a first casing having openings through its walls communicating with the inside of the aquarium, the first casing being placed on the aquarium bottom;
   a second casing having openings through its walls communicating with the inside of the aquarium, the second casing being located above the first casing;
   a filter medium housed in the second casing;
   a passageway for communication from the first casing to the second casing;
   a pump unit means located midway between the first casing and the second casing so that the water in the aquarium is circulated first through the second casing, then the filter medium, the passageway, and lastly the first casing.

2. A filtering device according to claim 1, wherein the pump unit is detachably connected to the first casing.

3. A filtering device according to claim 1, wherein the second casing is detachably connected to the pump unit.

4. A filtering device according to claim 3, wherein the pump unit is detachably connected to the first casing.

5. A filtering device according to claim 1, wherein the first casing has an open end of a size substantially equal to the whole area of the aquarium bottom so that the open end is closed by the bottom wall.

6. A filtering device according to claim 5, wherein the first casing comprises a conduit portion connectable to the passageway.

7. A filtering device according to claim 1, wherein the filter medium has a hollow body.

8. A filtering device according to claim 7, wherein the speed casing has a narrow opening engaging the passageway in the area of the pump unit.

9. A filtering device according to claim 7, wherein the second casing has a full-size open end opposite the narrow opening, covered with a lid.

10. A filtering device according to claim 1, wherein the second casing comprises a cylindrical body, and the filter medium has a hollow body whose inner space is aligned with an open end of the second casing at a point adjacent to the pump unit.

11. A filtering device according to claim 1, wherein the passageway comprises a portion of the pump unit and a portion of the first casing, wherein the two portions are connected to each other.

12. A filtering device adapted for use in household aquariums, the device comprising:
    a first casing having openings through its walls communicating with the inside of the aquarium, the first casing being placed on the aquarium bottom;
    a second casing having openings through its walls communicating with the inside of the aquarium, the second casing being located above the first casing;
    a cylindrical hollow filter medium housed in the second casing;
    a pump unit means located midway between the upper casing and the lower casing so that the water in the aquarium casing is circulated first through the second casing, then the filter medium, the passageway, and lastly the first casing;
    a passageway for communication from the second casing to the first casing, the passageway being constituted by detachably connecting a conduit portion of the pump unit to a conduit portion of the first casing; and
    wherein the first casing comprises a shallow tray-like body having a size substantially equal to the whole area of aquarium bottom.

13. A filtering device according to claim 12, wherein the second casing has a full-size open end covered with a lid.

* * * * *